(12) United States Patent
Lindgren et al.

(10) Patent No.: US 8,331,276 B2
(45) Date of Patent: Dec. 11, 2012

(54) METHOD FOR POWER SAVING IN A BASE STATION

(75) Inventors: Stefan Lindgren, Vallda (SE); Sten Sjöberg Sjöberg, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 12/676,401

(22) PCT Filed: Sep. 5, 2007

(86) PCT No.: PCT/SE2007/050620
§ 371 (c)(1),
(2), (4) Date: Mar. 4, 2010

(87) PCT Pub. No.: WO2009/031955
PCT Pub. Date: Mar. 12, 2009

(65) Prior Publication Data
US 2010/0189023 A1    Jul. 29, 2010

(51) Int. Cl.
*G08C 17/00* (2006.01)
(52) U.S. Cl. ....................................... 370/311
(58) Field of Classification Search ............... None
See application file for complete search history.

(56) References Cited

U.S. PATENT DOCUMENTS

| 2004/0192284 A1* | 9/2004 | Vaisanen et al. | 455/422.1 |
| 2007/0058661 A1* | 3/2007 | Chow | 370/445 |
| 2007/0230418 A1* | 10/2007 | Takeuchi et al. | 370/338 |
| 2008/0107047 A1* | 5/2008 | Olfat | 370/280 |
| 2008/0117848 A1* | 5/2008 | Yang et al. | 370/311 |

OTHER PUBLICATIONS

Omanand Jha Vatsa, et al, Adaptive Power Saving Algorithm for Mobile Subscriber Statin in 802,16e, Communication Systems Software and Middleware, 2007. Comsware 2007. $2_{nd}$ international Conference. pp. 1-7, Jan. 7-12, 2007.
Yan Zhang, et al. Energy Management in the IEEE 802.16e MAC, Communication Letters, IEEE, vol. 10, No. 4, Apr. 2006.
Yang Xiao, Energy Saving Mechanism in the IEEE 802.16e Wireless MAN. Communications Letter, IEEE, vol. 9, No. 7, Jul. 2005.

\* cited by examiner

*Primary Examiner* — Anh-Vu Ly

(57) ABSTRACT

A signal having a frame structure is transmitted and received in a cell by a first base station, the structure of the frame having a downlink frame part and an uplink frame part. Each frame part has the ability of carrying at least one data region allocated to at least one user or broadcasted for the traffic flow between the telecommunication network and the user terminal via the first base station. The downlink frame part has an overhead part with at least synchronization or system information. The frame structured signal is transmitted periodically Frame N, Frame N+1, Frame N+2, Frame N+3 with a normal interval defined by the system. The system during, a power saving mode, increases the interval between at least a first and the next following second frame structured signal to a power saving interval.

10 Claims, 2 Drawing Sheets

METHOD FOR POWER SAVING IN A BASE STATION

TECHNICAL FIELD

The invention relates to a method, system, and node for energy saving in a telecommunication system.

BACKGROUND

Mobile communication is one of the most important technologies for contributing to social and economic development around the world. Optimizing energy efficiency will not only reduce environmental impact, it will also cut network costs which will give benefits for all using the mobile systems.

Modern standards as WCDMA, LTE and WiMAX have very high capacity in terms of users and throughput, which requires a large amount of energy. In order to achieve high data throughput in the cellular systems a dense cell plan has to be deployed. A base station consumes considerable amount of power, typical 65000 kWh per station and year.

Network design is a key issue improving the energy-efficiency. No amount of energy efficiency at the component level can make up for an inefficiently designed network. For instance the number of radio sites should be optimized for the coverage and quality that needs to be achieved.

In order to achieve an energy-efficient design a number of issues have to be addressed from start. At first, the true network needs has to be addressed. The exact coverage, capacity and quality have to be considered before getting into considerations about individual sites and equipment specifications. Moreover, the current and future business environment needs has to be considered, considering the possibility to rebuild or expand sites. Once these factors have been considered the operator should begin the network design process, looking into the total cost of the ownership and the alternative design options.

Capital expenditure typically represents a very small portion of the total cost of the ownership. Instead, the long term savings from site reduction and efficient operation is significant, with a significant reduction in energy consumption as a key issue.

Optimizing solutions for reducing energy consumption means that every stone has to be turned over. Still, the total network solution is greater than the sum of their parts. This means that combining the best components in a package does not always give the best results. In the radio base station the relative energy consumption of the different components vary on the dependency of the properties of the components it has to work with.

Typical sources of energy consumption in the base station are signal processing, RF conversion, power amplification, power supply, climate equipment (air conditioning) and feeder. For instance, In traditional base stations the equipment is located on the ground which means that the antennas has to be fed using several meters of cable. Half of the emitted power can be lost in the feeders. By placing the equipment in the top of the tower, significant reductions in energy consumption is achieved. The equipment can be combined with a battery back-up unit that minimizes hardware and energy consumption.

Another way in which energy reduction can be achieved is through the use of stand-by modes. Base station sites are dimensioned to cope with peak hours. In a cell a number of TRX (transmitters) can run at the same time. Using power management schemes, some TRX can be put in stand-by instead of running in idling mode during low traffic hours.

Other ways of reducing the energy consumption is to avoid unnecessary DC/DC conversion and reduce the need of cooling fans and cooling systems. Modules based on digital power management can also reduce energy consumption.

There is an increasing need of delivering wireless technology with broadband capacity for cellular networks. A good broadband system must fulfill certain criteria, such as high data rate and capacity, low cost per bit, good Quality of Service and greater coverage. High Speed Packet Access (HSPA) and Mobile WiMAX are examples two network access technologies that enable this. Both of these uses a frame structure for the uplink and downlink communication between the base station and the mobile terminal. In the following part of the background, the technology of WiMAX will be introduced as an example of a technology using frame structure, but other technologies such as WCDMA, GSM, HSPA and Long Term Evolution (LTE) also use frame structuring. The frames of the different technologies differ to some extent.

WiMAX refers to the IEEE standard 802-16 where Mobile WiMAX relates to 802.16e-2005. Mobile WiMAX is an improvement of the modulation schemes used in earlier (fixed) WiMAX standards by the introduction of Scalable Orthogonal Frequency Division Multiple Access (SOFDMA) to carry data and supporting channel bandwidths with a large number of sub-carriers on different frequencies (sub-channels) within the band. The large number of sub-carriers improves the performance in multipath fading channels.

Scalable OFDMA is a statistical multiplexing technology, and scalable refers to the ability of the communication channel to be divided into a number of variable bit-rate digital channels (sub-carriers) or data streams. It means a dynamic scheduling wherein a time slot in the access assigned by the base station can enlarge and contract but still remain assigned to the particular mobile terminal. Different numbers of sub-carriers can be assigned to different users, and the Quality of Service, i.e. data rate and error probability, can be controlled individually for each user since the sub-channels are variable. The band-width of the channel can flex between 1.25 and 20 MHz. OFDMA (on which SOFDMA is based) has fixed sub-carrier band-width.

OFDMA is a multi-user version of Orthogonal Frequency Division Multiplexing (OFDM) modulation scheme. OFDM is for one single user in contrast to OFDMA. OFDM(A) uses a large number of sub-carriers, in which each sub-carrier is modulated for instance with Quadrature Amplitude Modulation (QAM). OFDM has the ability to cope with severe channel conditions, which makes Mobile WiMAX very robust. OFDM also has high spectral efficiency. OFDM may be viewed as using many slowly-modulated narrowband signals rather than one rapidly-modulated wideband signal. QAM will not be described any further in this document.

The duplex method of Mobile WiMAX is Time Division Duplex (TDD). TDD only occupies one single channel, with uplink and down link traffic assigned to different time slots. TDD with OFDMA provides subchannels and time slots enabling multi access for different users. TDD has an advantage in the case where the asymmetry of the uplink and downlink data speed is variable. As the amount of uplink data increases, more bandwidth can dynamically be allocated to that.

The ability of sub-channelling by OFDMA is shown in FIG. 1, which figure illustrates the frame structure schematically. The frame structure as visualized comprises a number of subchannels and a number of time slots, enabled by OFDMA being a statistical multiplexing technique. The data regions 11,12,13,14 of the different user devices 11,12,13,14 are illustrated in the figure.

Mobile WiMAX transmitted via base stations uses SOFDMA with TDD. FIG. 2 shows a more detailed schematic view of a frame structure for OFDMA when operating in TDD mode. The frame (Frame N) comprises a downlink subframe 15, a following uplink subframe 16, a small guard interval 20 between the downlink and uplink subframe and an end interval 22 between the uplink and the downlink subframe of the next frame. In mobile WiMAX these frames are 5 ms long. Some WiMAX systems support OFDMA operating in Frequency division duplexing (FDD) in which the frame structure differs from TDD in that the uplink and downlink frames are transmitted at the same time over different carriers. TDD will in the future be used for most WiMAX deployments, since it allows for a more flexible sharing of bandwidth between up- and downlink, does not requires paired spectrum and has a reciprocal channel that can be exploited for spatial processing.

The downlink subframe 15 in TDD begins with overhead information for informing the user device about the characteristics of the system. The overhead comprises synchronization information 17 and system information 18. The overhead is followed by data regions 19 for the downlink data traffic in the downlink subframe. A guard interval 20 is followed by an uplink subframe 21 with data regions for the uplink data traffic from the different user devices. Finally there is the end interval 22 followed by the overhead synchronization information 17 of the next frame.

In WiMAX particularly, the overhead begins with a downlink preamble that is used for physical-layer procedures (cell detection, time and frequency synchronization). The preamble is followed by a frame control header providing frame configuration and system information (modulation and coding maps) to find where and how to decode downlink and uplink. The frame control header and maps are sent for each available data region 19, 21.

Uplink and downlink subframes can instead of TDD be divided with Frequency Division Duplex. FDD is more efficient in the case of symmetric traffic. Another advantage is that it makes radio planning easier and more efficient. Compared with TDD, FDD divides the subframe by frequency instead, which means that the subframes are sent at the same time using different frequencies.

In order to achieve high data throughput in cellular systems, high order modulation, e.g. 64 QAM and high transmit power is used at the base station. The physical resources in term of subcarriers and time are kept to a minimum to maximize the user data throughput. High performance power amplifier is needed to keep the signal prosperities after the amplification. Especially the linearity of the amplification is important. This requires a lot of energy which increases the energy consumption of the base station. Due to these requirements the amplifier efficiency is low and contributes to a large extent the base station power consumption.

During low load or no load scenarios the base station still needs to transmit the system and synchronization information 17,18 to serve the attached mobiles and so a new mobile can access the system. The information has to be transmitted with enough power to reach all mobiles within the cell and is therefore transmitted with low modulation order and high output power. Due to these transmissions the base station power consumption is still quite significant.

SUMMARY

The method according to the present invention relates to a method for energy saving in a telecommunication system with at least one first base station for enabling communication within the cell. A signal having a frame structure is transmitted and received in the cell by the first base station, the structure of the frame comprising a downlink frame part and an uplink frame part. Each frame part has the ability of carrying at least one data region allocated to at least one user or broadcasted for the traffic flow between the telecommunication network and the user terminal via the first base station. The downlink frame part comprises an overhead part with at least synchronization or system information. The frame structured signal is transmitted periodically with a normal interval defined by the system. What particularly characterized the method is that the system during a power saving mode increases the interval between at least a first and the next following second frame structured signal to a power saving interval.

The node according to the present invention relates to a node in the telecommunication system with at least one first base station for enabling communication within the cell. The system is adapted for transmitting and receiving in the cell the signal with a frame structure, the structure of the frame comprising a downlink frame part and a following uplink frame part. Each frame part has the ability of carrying at least one data region allocated to at least one user or broadcasted for the traffic flow between the telecommunication network and the user terminal via the first base station. The downlink frame part comprising an overhead part with at least synchronization or system information. The system is adapted for transmitting the frame structured signal periodically with a normal interval defined by the system. What particularly characterizes the node is that it is adapted for increasing the interval between at least a first and the next following second frame structured signal during a power saving mode.

The system according to the present invention relates to a telecommunication system with at least one first base station for enabling communication within the cell. The system is adapted for transmitting and receiving in the cell the signal with a frame structure, the structure of the frame comprising a downlink frame part and an uplink frame part. Each frame part has the ability of carrying at least one data region allocated to at least one user or broadcasted for the traffic flow between the telecommunication network and the user terminal via the first base station. The downlink frame part comprising an overhead part with at least synchronization or system information. The system is adapted for transmitting the frame structured signal periodically with a normal interval defined by the system. What particularly characterizes the telecommunication system is that it is adapted for increasing the interval between at least a first and the next following second frame structured signal during a power saving mode.

The advantage of the present invention is that by introducing a power saving mode the base station power consumption is decreased with a method that can easily be introduced in present and upcoming standards.

BRIEF DESCRIPTION OF DRAWINGS

In the following text the invention will be described in detail with reference to the attached drawings. These drawings are used for illustration only and do not in any way limit the scope of the invention.

DETAILED DESCRIPTION

Figure 1:
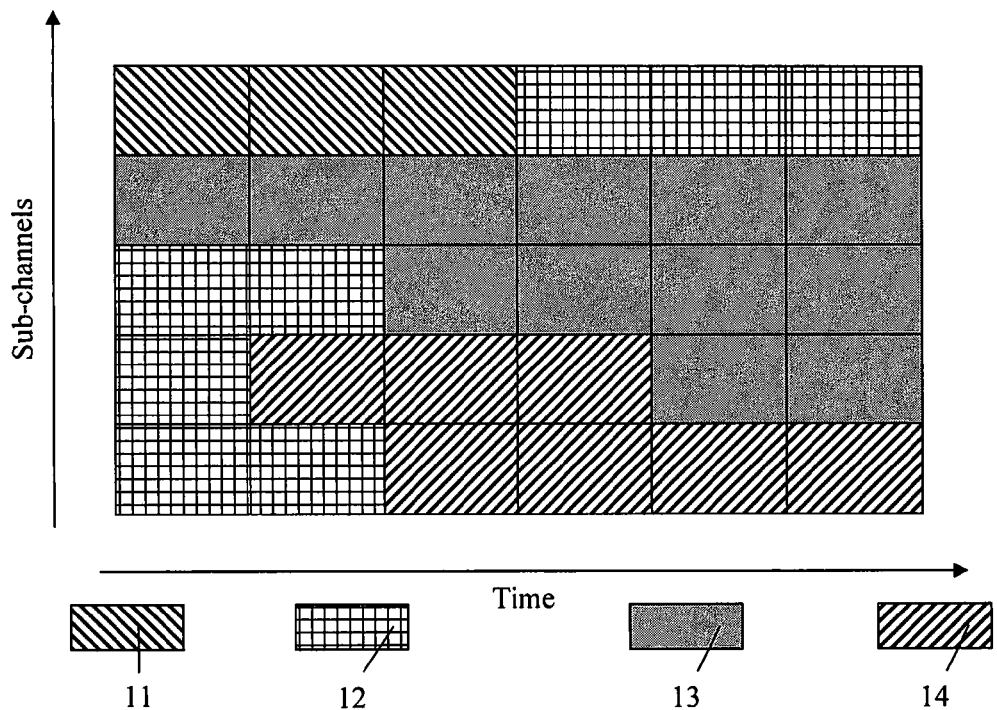
FIG. 1 shows a schematic view of the OFDMA frame structure.
Figure 2:
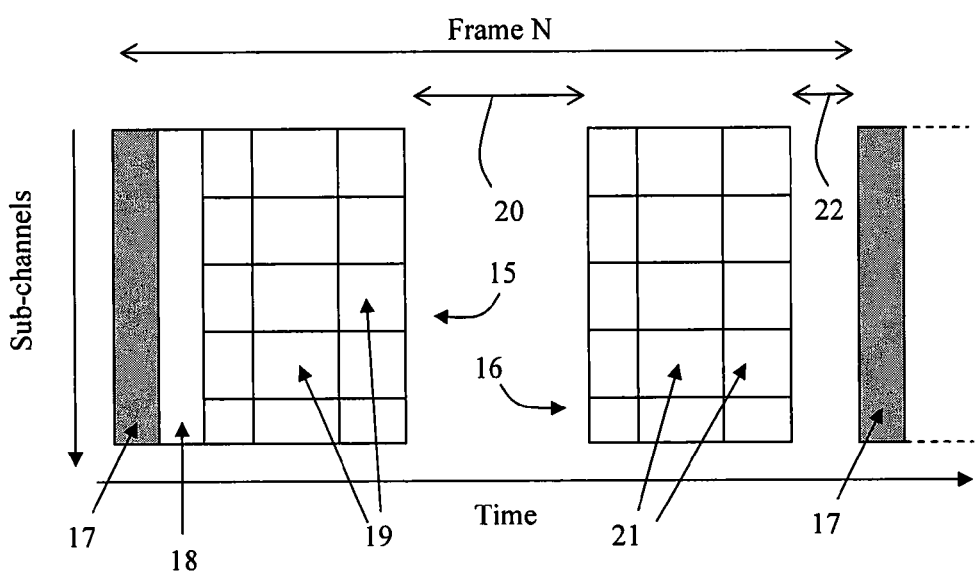
FIG. 2 shows a more detailed schematic view for the OFDMA frame structure when operating in TDD mode.

The invention will now be described in detail with reference to embodiments described in the detailed description and shown in the drawings. FIGS. 1 and 2 have already been described in relation to Background above.

The embodiments refer to a method for energy saving in a telecommunication system. The telecommunication system and node is adapted for performing said method described herein.

The telecommunication system comprises at least one first base station for enabling communication within a cell. A base station communicates with a mobile user terminal, such as a hand-held phone. In the telecommunication system, the base station enables the communication between one or more mobile telephones within a cell (a cell is a geographic area covered by the base station) and the base station.

A signal 23 having a frame structure is transmitted and received in the cell by the first base station, the structure of the frame comprising a downlink frame part 15 and an uplink frame part 16.

The embodiment shown in FIG. 2, which relates to TDD, comprises a frame part 15 in form of a subframe followed by a frame part 16 also in form of a subframe. The frame structure in TDD is divided into a downlink subframe a following uplink subframe, a small guard interval 20 (see FIG. 2) between the downlink and uplink subframe and an end interval 22 (see FIG. 2) between the uplink and the downlink subframe of the next frame. It should however be understood by the person skilled in the art that the feature "frame part" as disclosed in the claims also includes embodiments with FDD, in which the frame parts are divided by frequency instead, or other technologies for duplex.

Each frame part has the ability of carrying at least one data region allocated to at least one user or broadcasted for the traffic flow between the telecommunication network and the user terminal via the first base station. The fact that the allocated to at least one user or broadcasted means that the invention includes both unicast traffic flow between the system and one user terminal, multicast between the system and a group of user terminals and broadcast between the system and every user terminal within a broadcast domain.

The downlink frame part 15 comprises an overhead part 17, 18 with at least synchronization or system information. Often both information types 17, 18 are included but there is an option that only one of these types is included in the overhead. Still, at least one of the synchronization or system information has to be transmitted. Consequently, the term "or" will be used.

As described in connection with FIG. 2 the downlink frame part 15 begins with overhead information for informing the user device about the characteristics of the system. The overhead comprises at least synchronization information 17 or system information 18. The synchronization information is used for time and frequency synchronization between the first base station and the user terminal.

Figure 3:
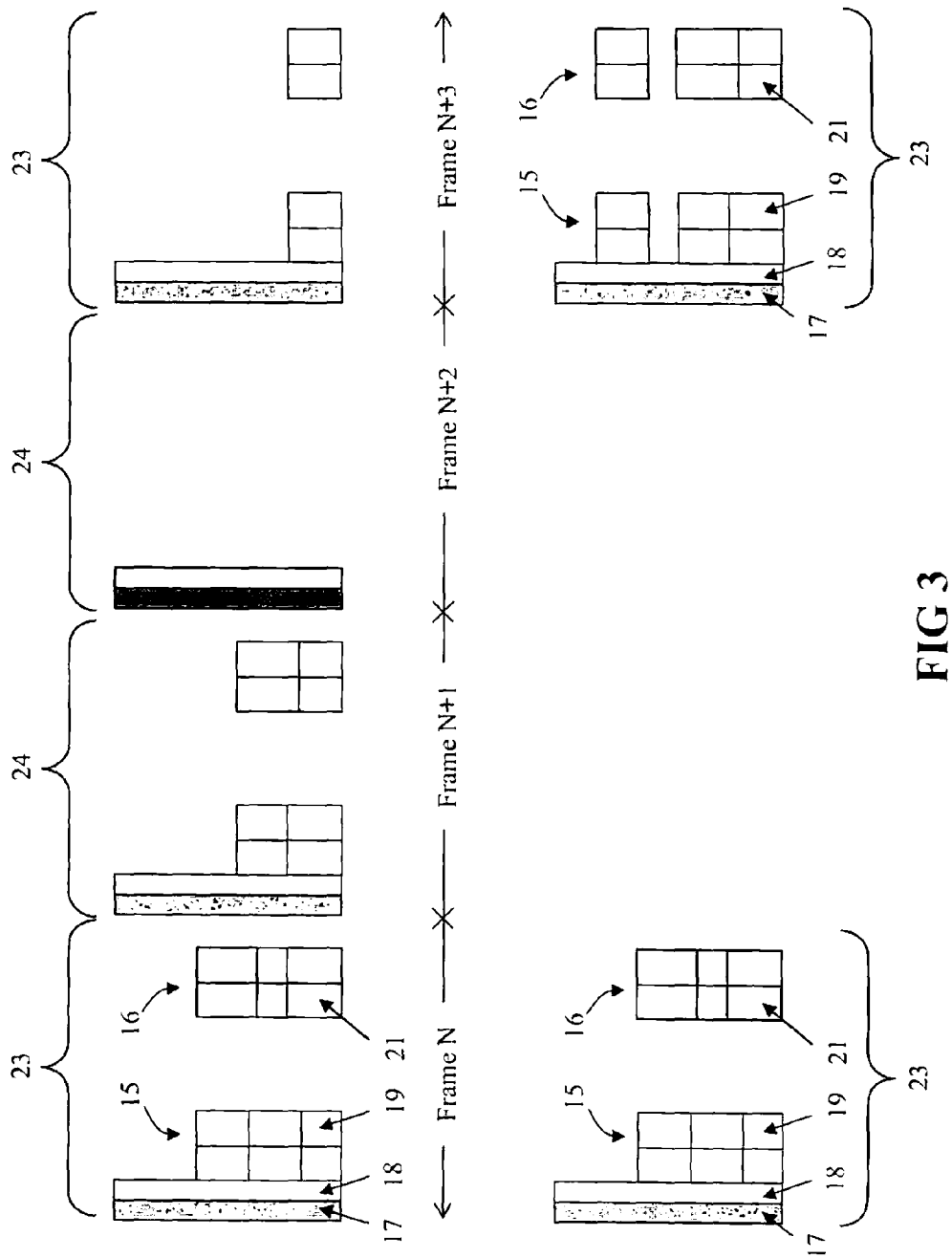
FIG. 3 shows the signal transmission from the base station in low load situation with and without power saving mode.

The system information contains modulation and coding scheme and maps which enables frame configuration between the first base station and the user terminal. The overhead is followed by the data regions 19 for the downlink data traffic in the downlink frame part 15, the uplink frame part 16 with data regions 21 for the uplink data traffic from the different user terminals. As illustrated in FIG. 3 the data regions 19, 21 may vary in size from one signal to the next, which is enabled for instance with OFDMA.

FIG. 3 illustrates the fact that the frame structured signal 23, 24 is transmitted periodically with a normal interval defined by the system. A normal interval in OFDMA is 5 ms. As shown there is a frame Frame N followed by frames Frame N+1, Frame N+2, Frame N+3 and so forth.

The embodiment shown in FIG. 3, which also relates to TDD, comprises a frame part 15 in form of a subframe followed by a frame part 16 also in form of a subframe. It should however be understood by the person skilled in the art that the feature "frame part" as disclosed in the claims also includes embodiments with FDD, in which the frame parts are divided by frequency instead, or other technologies for duplex. In FDD, this means that the frame parts can instead be transmitted at the same time.

The signal 23, 24 has to be transmitted periodically even if no data regions 19, 21 are included. During low load or no load scenarios the first base station still needs to transmit at least the system or synchronization information 17, 18 to serve the attached mobiles and so a new mobile can access the system. The information has to be transmitted with enough power to reach all mobiles within the cell and is therefore transmitted with low modulation order and high output power. Due to these transmissions the first base station power consumption is still quite significant.

The object of the present invention is to increase the energy efficiency in a base station with a frame structure technology. The scope of the present invention is therefore, as described in the characterizing portion of the independent claims, that the system during a power saving mode increases the interval between at least a first 23 and the next following second frame structured signal 23 to a power saving interval. The second signal (se FIG. 23, lower part) is the next signal which follows immediately after the first signal. The overhead part is contained in each transmitted signal and by increasing the interval to the power saving interval power savings will be achieved.

The power saving interval is enabled by interrupting at least one third frame structured signal 24, see FIG. 3 lower part. This means that in order to save energy at least one frame structured signal, named the third signal, is interrupted. As an example the system may transmit three signals 23 and thereafter interrupt ten signals 24. The three signals in one row gives the user terminal time to decode the information in the overhead part 17, 18, such as UL map data, and process the information to be sent in the UL frame part 21.

The power saving interval is optionally enabled by interrupting the frame structured signal 24 periodically. The frame structured signal is further optionally interrupted by interrupting the overhead part 17, 18. For instance at least every second signal is interrupted. This is shown in FIG. 3 in the lower part where the interval is increased 3 times by interrupting two signals Frame N+1 and Frame N+2. Since the overhead part of Frame N+1 and Frame N+2 is transmitted with enough power to reach all mobiles within the cell such an interruption will save a significant amount of energy.

The fact is also that the interrupted signals contains overhead parts 17,18 which do not have to be sent later. Instead only the data region or regions 19,21 of the interrupted signal are included in the frame of the next signal transmitted. This is shown in the signal 23 in Frame N+3 (see lower part of the figure) where the data regions from Frame N+1 and Frame N+3 (see upper part of the figure) are included in the signal.

The power saving mode is activated by the system at certain operating conditions such as the level of usage for the cell capacity, the number of user terminals in the cell and/or statistics of cell usage over time. The intent of the present invention is to monitor the system continuously and if the traffic load goes down for a period of time the power saving mode may be activated. Using statistics of traffic load over time will also be very useful. For instance it may be that an operator has monitored a low traffic load in a certain cell at night between midnight and 06.00 in the morning. The operator may then via a management system modify the operation of this base station so that the power saving mode is activated every night between midnight and 06.00. The system may also be modified so that if the traffic load is below a certain level the power saving mode is activated. It is the operator that decides which quality of service that will be provided at certain conditions.

It is vital that the user terminal is aware of the power saving mode. Therefore, the overhead part of the transmitted frame structured signals during the power saving mode comprises information about the power saving mode and its properties such as the power saving interval. The power saving interval can e.g. be given in a management message such as a downlink channel descriptor or as a value, or a code, in the map in each transmitted frame.

The overhead part of the frame structure signal is transmitted with enough power to reach all user terminals within the cell wherein the data region or regions are transmitted.

The power saving mode is controlled by an algorithm which is loaded into the system in order to enable said method for energy saving.

The invention also relates to a node in the telecommunication system with at least one first base station for enabling communication within the cell. The system is adapted for transmitting and receiving in the cell the signal 23 with a frame structure, the structure of the frame Frame N, Frame N+1, Frame N+2, Frame N+3 comprising a downlink frame part 15 and a following uplink frame part 16. Each frame part has the ability of carrying at least one data region 19, 21 allocated to at least one user or broadcasted for the traffic flow between the telecommunication network and the user terminal via the first base station. The downlink frame part 16 comprising an overhead part 17, 18 with at least synchronization or system information. The system is adapted for transmitting the frame structured signal periodically with a normal interval defined by the system.

What particularly characterizes the node is that it is adapted for increasing the interval between at least a first 23 and the next following second frame structured signal 23 during a power saving mode. The system may comprise an algorithm which controls the power saving mode.

The present invention also relates to a telecommunication system with at least one first base station for enabling communication within the cell. The system is adapted for transmitting and receiving in the cell the signal 23 with a frame structure, the structure of the frame Frame N, Frame N+1, Frame N+2, Frame N+3 comprising a downlink frame part 15 and an uplink frame part 16. Each frame part has the ability of carrying at least one data region 19, 21 allocated to at least one user or broadcasted for the traffic flow between the telecommunication network and the user terminal via the first base station. The downlink frame part 16 comprising an overhead part 17, 18 with at least synchronization or system information. The system is adapted for transmitting the frame structured signal periodically with a normal interval defined by the system.

What particularly characterizes the telecommunication system is that it is adapted for increasing the interval between at least a first 23 and the next following second frame structured signal 23 during a power saving mode. The system may comprise an algorithm which controls the power saving mode.

The technology of the system is for instance WiMAX, LTE, UMTS or GSM which are all systems operating with frames/frame structure. Consequently, every system having frames as an overhead consuming a large amount of energy relevant in relation to the present invention. As an option the system operates with OFDMA for enabling multiple accesses. The system may use high order modulation scheme such as 64 QAM. The algorithm loaded into the system controls the power saving mode.

It will also be appreciated by the person skilled in the art that various modifications may be made to the above-described embodiments without departing from the scope of the present invention. A possible variant is to just use the extended power saving interval for base station downlink transmissions and scheduled uplink transmissions but keep a standing allocation for random access attempts to reduce the latency while in power saving mode.

What is claimed is:

1. A method for energy saving in a telecommunication system having at least one first base station for enabling communication within a cell, a signal having a frame structure being transmitted and received in the cell by the first base station, the structure of the frame comprising a downlink frame part and an uplink frame part, each frame part having the ability of carrying at least one data region allocated to at least one user terminal or broadcasted for traffic flow between the telecommunication system and the user terminal via the first base station, the downlink frame part having an overhead part with at least synchronization or system information, the frame structured signal being transmitted periodically (Frame N, Frame N+1, Frame N+2, Frame N+3, wherein N is an integer) with a normal interval defined by the system, the method comprising the steps of:
    increasing, by the telecommunication system while in a power saving mode, the interval between at least a first and the next following second frame structured signal to a power saving interval;
    enabling the power saving mode by interrupting at least one third frame structured signal; and
    including at least the data region or regions of the interrupted signal in the frame of the next signal transmitted.

2. The method according to claim 1, wherein the normal interval is 5 ms.

3. The method according to claim 1, wherein the overhead part is contained in each transmitted signal.

4. The method according to claim 1, further comprising the step of periodically interrupting the third frame structured signal.

5. The method according to claim 1, wherein at least every second signal is interrupted.

6. The method according to claim 1, further comprising the step of interrupting the overhead part of the third frame structured signal.

7. The method according to claim 1, further comprising the step of activating the power saving mode at certain operating conditions, such operating conditions being selected from a group consisting of a level of usage for cell capacity, the number of user terminals in the cell, and statistics of cell usage over time.

8. The method according to claim 1, further comprising the step of including in the overhead part of each transmitted frame structured signal while in the power saving mode, information about the power saving mode and the power saving interval.

9. The method according to claim 1, wherein the overhead part of each transmitted frame structured signal is transmitted with enough power to reach all user terminals within the cell wherein the data region or regions are transmitted.

10. The method according to claim 1, wherein the power saving mode is controlled by an algorithm.

* * * * *

UNITED STATES PATENT AND TRADEMARK OFFICE
CERTIFICATE OF CORRECTION

PATENT NO. : 8,331,276 B2
APPLICATION NO. : 12/676401
DATED : December 11, 2012
INVENTOR(S) : Lindgren et al.

It is certified that error appears in the above-identified patent and that said Letters Patent is hereby corrected as shown below:

On the Title Page, in Field (75), under "Inventors", in Column 1, Line 2,
delete "Sjöberg Sjöberg," and insert -- Sjöberg, --, therefor.

On the Title Page, in Field (56), under "OTHER PUBLICATIONS", in Column 2,
Line 3, delete "$2_{nd}$" and insert -- $2^{nd}$ --, therefor.

Signed and Sealed this
Nineteenth Day of March, 2013

Teresa Stanek Rea
*Acting Director of the United States Patent and Trademark Office*